(12) United States Patent
Phu et al.

(10) Patent No.: US 7,551,404 B1
(45) Date of Patent: Jun. 23, 2009

(54) LOAD BEAM HAVING CONCAVE STIFFENER WITH LOCATING FLANGES

(75) Inventors: Johnathan Phu, Temecula, CA (US); Chu Wong, Temecula, CA (US); Peter Hahn, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 461 days.

(21) Appl. No.: 11/233,191

(22) Filed: Sep. 21, 2005

Related U.S. Application Data

(60) Provisional application No. 60/711,938, filed on Aug. 26, 2005.

(51) Int. Cl.
  *G11B 5/55* (2006.01)
  *G11B 21/08* (2006.01)
(52) U.S. Cl. .................................. 360/266; 360/244.9
(58) Field of Classification Search ................ 360/266, 360/265.9, 244.9
  See application file for complete search history.

(56) References Cited

U.S. PATENT DOCUMENTS

| | | | |
|---|---|---|---|
| 5,731,931 A * | 3/1998 | Goss | 360/244.9 |
| 5,734,526 A | 3/1998 | Symons | |
| 5,793,569 A * | 8/1998 | Christianson et al. | 360/244.3 |
| 5,815,348 A * | 9/1998 | Danielson et al. | 360/244.9 |
| 5,894,655 A | 4/1999 | Symons | |
| 5,966,269 A | 10/1999 | Marek et al. | |
| 6,014,289 A | 1/2000 | Goss | |
| 6,201,664 B1 * | 3/2001 | Le et al. | 360/244.9 |
| 6,392,843 B1 * | 5/2002 | Murphy | 360/245.3 |
| 6,731,465 B2 | 5/2004 | Crane et al. | |
| 6,801,405 B2 | 10/2004 | Boutaghou et al. | |
| 2002/0109943 A1 * | 8/2002 | Crane et al. | 360/244.3 |

* cited by examiner

*Primary Examiner*—Andrea L Wellington
*Assistant Examiner*—Adam B Dravininkas
(74) *Attorney, Agent, or Firm*—Intellectual Property Law Offices of Joel Voelzke, APC

(57) ABSTRACT

A disk drive suspension has a mount plate, an outwardly tapered load beam supported by the mount plate and having a base portion, a hinge portion, a beam portion having a first face with turned edges and a flexure supported by the beam portion distally of said beam portion face, and a generally congruent tapered stiffener having a central portion of a given height that is concave and open to the beam portion. The stiffener has left and right flange portions extending laterally from the central portion to the beam portion upturned edges to locate said central portion centrally on the beam portion face.

17 Claims, 3 Drawing Sheets

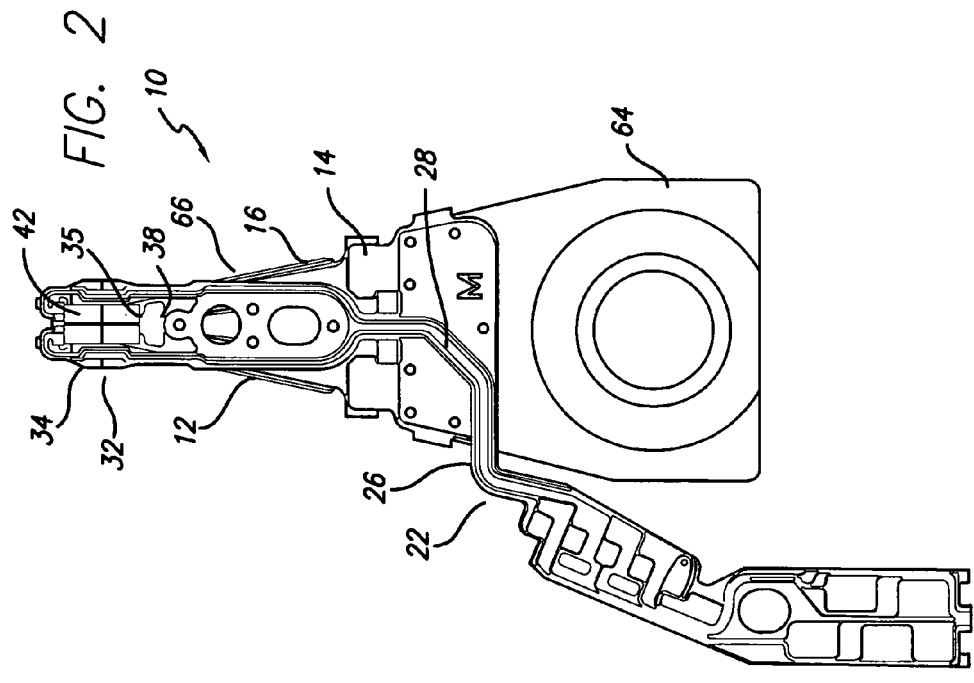
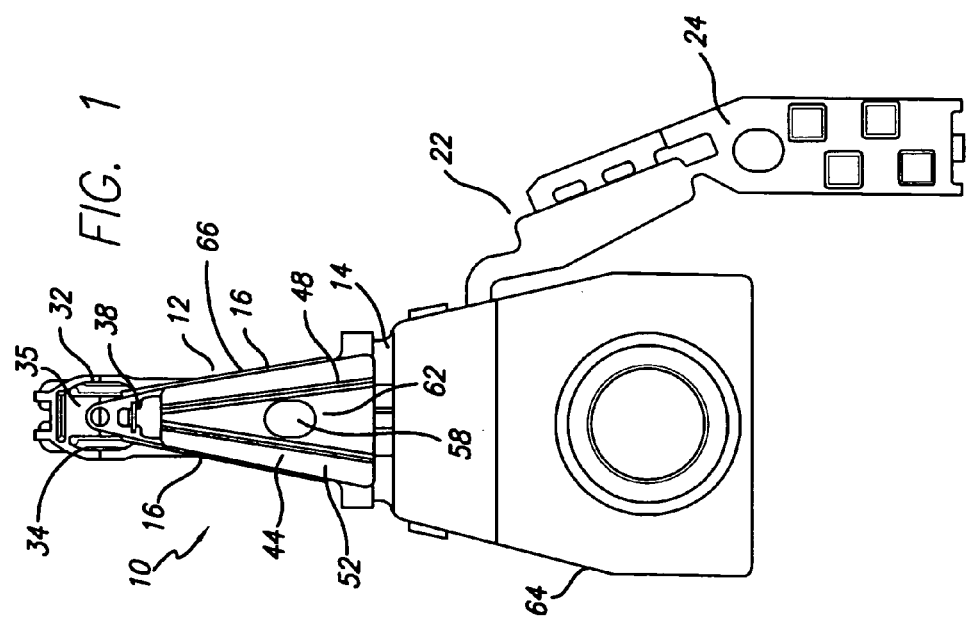

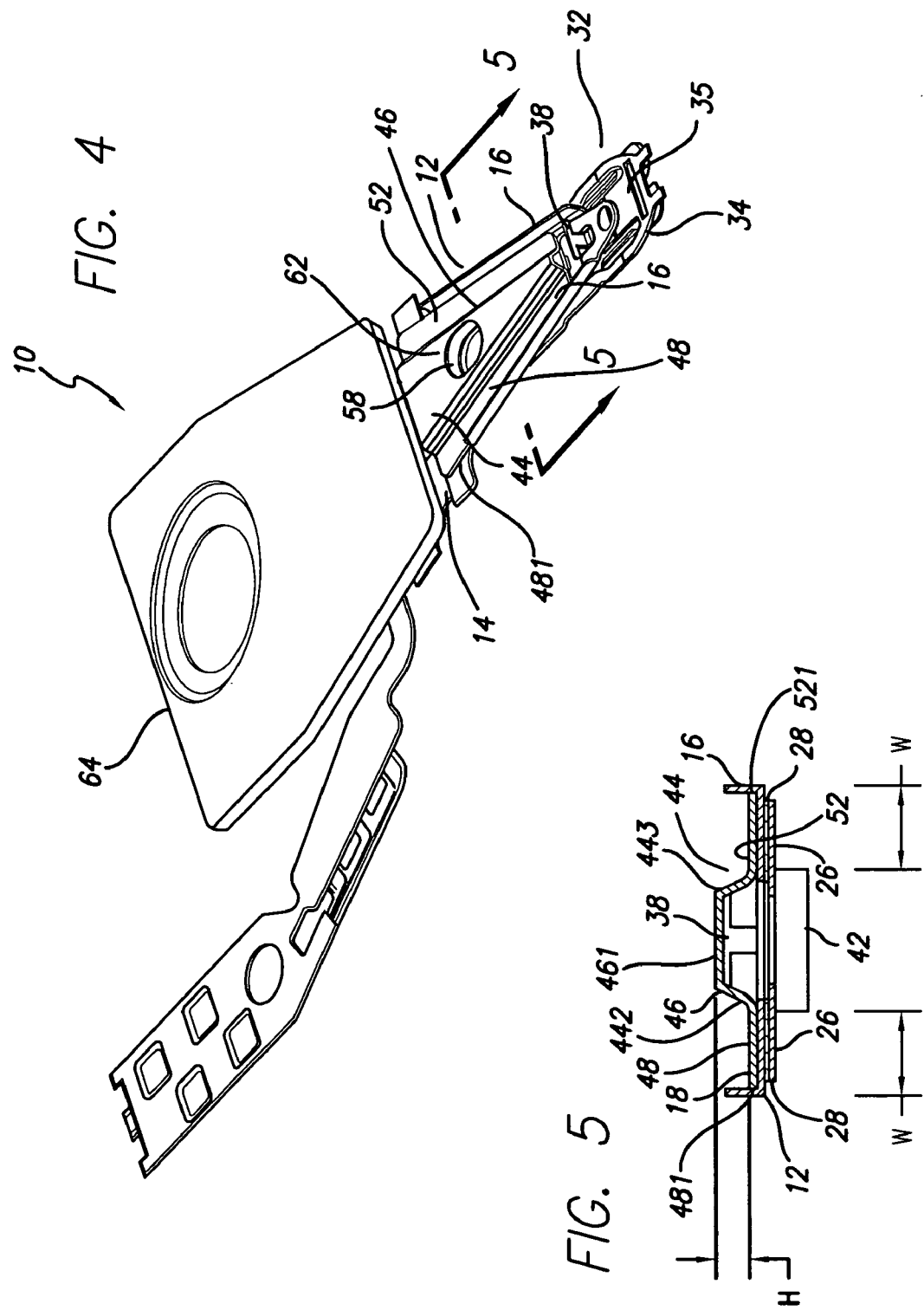

LOAD BEAM HAVING CONCAVE STIFFENER WITH LOCATING FLANGES

CROSS-REFERENCE TO RELATED APPLICATIONS

This application claims the benefit of U.S. Provisional Application Ser. No. 60/711,938, filed Aug. 26, 2005.

BACKGROUND OF THE INVENTION

1. Field of the Invention

This invention relates to disk drive suspensions, and more particularly, to disk drive suspensions having improved stiffening through the use on a suspension load beam having edge rails of a centrally concave stiffener. The stiffener is positioned on the suspension using flanges to the left and right of the stiffener central portion that oppose the beam edge rails. The concavity of the stiffener provides in association with the generally planar of the load beam a monocoque structure that improves resonance frequency without necessarily greater mass and consequent loss of shock performance.

2. Description of the Related Art

Monocoque and monocoque-like structures are known in disk drive suspensions including those described in U.S. Pat. No. 5,731,931 and U.S. Pat. No. 6,014,289 to Goss, U.S. Pat. No. 5,734,526 and U.S. Pat. No. 5,894,655 to Symons, U.S. Pat. No. 5,966,269 to Marek et al, U.S. Pat. No. 6,731,465 to Crane et al and U.S. Pat. No. 6,801,405 to Boutaghou et al.

BRIEF SUMMARY OF THE INVENTION

It is an object of the invention to provide a novel and improved disk drive suspension. It is a further object to provide a monocoque disk drive suspension having a beam portion first face with turned edges and a generally congruent stiffener having a central portion of a given height that is concave and open to the beam portion. It is a further object to provide such a disk drive suspension in which the stiffener has left and right flange portions extending laterally from the central portion to the beam portion upturned edges to locate said central portion centrally on the beam portion face.

These and other objects of the invention to become apparent hereinafter are realized in a disk drive suspension comprising a beam portion having edge rails at a first face and a flexure supported by the beam portion distally of the edge rails, and a stiffener having a concave portion of a given height open to the first face and left and right flange portions of respective given widths flanking the concave portion and attached to the first face in concave portion spacing relation by substantially the given widths from the edge rails.

In this and like embodiments, typically, the beam portion first face is tapered toward the flexure, and the stiffener is generally congruent with the first face, the flange portions have outward facing lateral edges, the lateral edges substantially abutting the edge rails, the concave portion has a height dimension between the flanges and the top of the concave portion, and each flange portion has a width dimension between the concave portion and an outward facing lateral edge of the portion, the concave height dimension being less than each flange width dimension, the beam portion face has a beam portion aperture defining an alignment feature, and the stiffener concave portion has a concave portion aperture defining a cooperating alignment feature for registering the stiffener with the beam portion face. The disk drive suspension can further comprise a flexible circuit comprising a metal layer defining the flexure, a plural trace conductors and an insulative film between the metal layer and the conductors.

In a further embodiment, the invention provides a disk drive suspension comprising a mount plate, a hinge portion, an outwardly tapered load beam supported by the hinge portion, the beam portion having a first face with turned edges, and a flexure supported by the beam portion distally of the first face, and a generally congruent tapered stiffener, the stiffener having a central portion of a given height concave and open to the first face, the stiffener having left and right flange portions extending laterally from the central portion to the upturned edges to locate the central portion centrally on the first face.

In this and like embodiments, typically, the flange portions have outward facing lateral edges, the lateral edges substantially abutting the face turned edges, the central portion has a height dimension between the flanges and the top of the central portion, and each flange portion has a width dimension between the central portion and an outward facing lateral edge of the flange portion, the central portion height dimension being not more than either flange width dimension, the beam portion face and the central portion have cooperating aligning structures for registering the stiffener with the beam portion face, and there is provided a flexible circuit comprising a metal layer suitably defining the flexure, plural trace conductors and an insulative film between the metal layers and the conductors.

In its method aspects the invention includes the method of stiffening a load beam, including juxtaposing with a load beam beam portion having edge rails a generally congruent stiffener having a central portion open to the beam portion and flanges extending laterally outward from the central portion and having lateral edges, and centrally locating the stiffener central portion on the beam portion by juxtaposing the flange lateral edges with the edge rails.

BRIEF DESCRIPTION OF THE SEVERAL VIEWS OF THE DRAWINGS

The invention will be further described in conjunction with the attached drawings in which:

FIG. 1 is a top plan view of the invention suspension;

FIG. 2 is a bottom plan view thereof;

FIG. 4 is an assembled view of the embodiment shown in FIG. 3; and

FIG. 5 is a view taken on line 5-5 in FIG. 4.

DETAILED DESCRIPTION OF THE INVENTION

Figure 3:
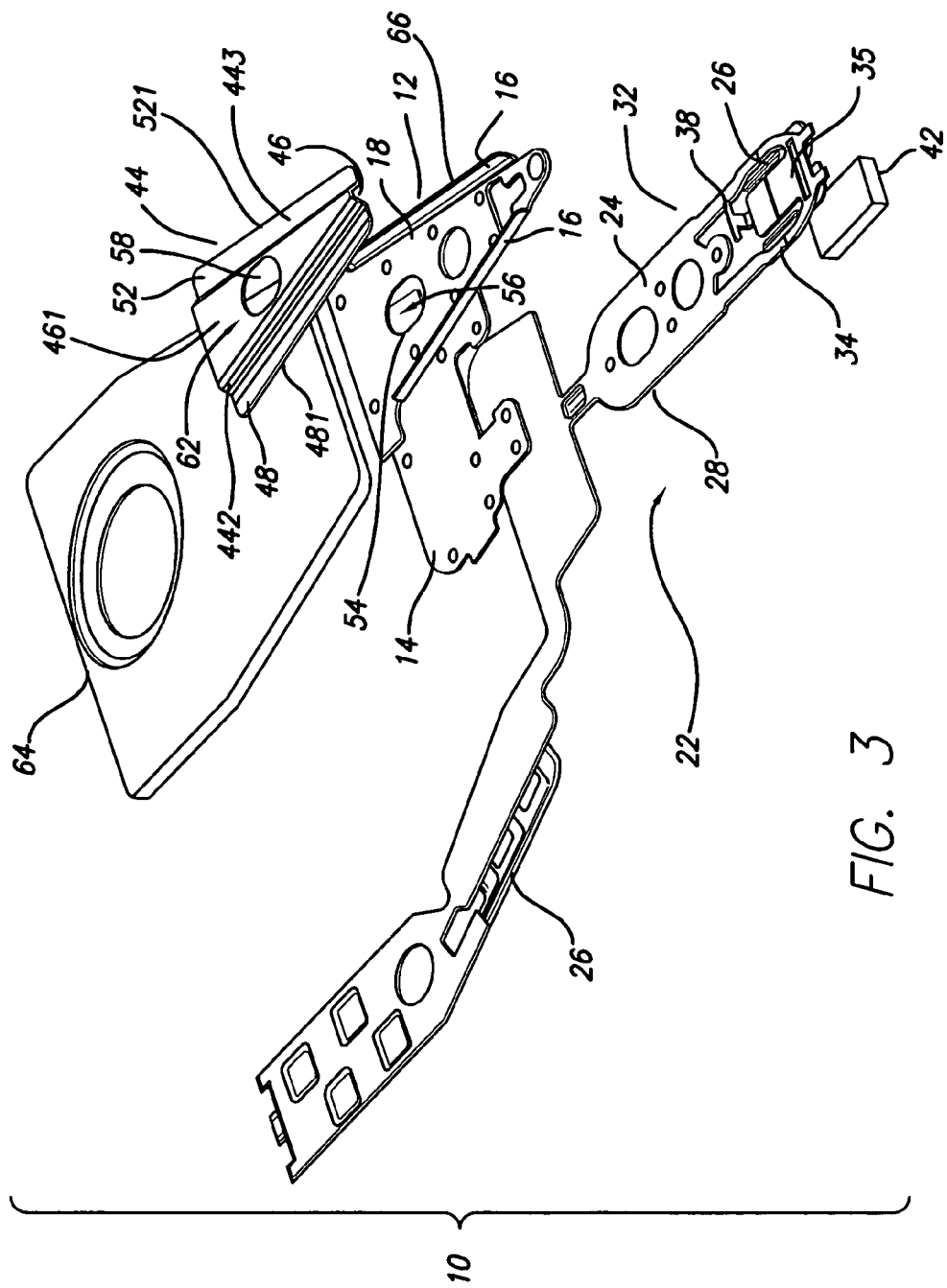
FIG. 3 is an exploded, oblique view thereof.

With reference now to the drawings in detail, in FIGS. 1-5 disk drive suspension 10 comprises a load beam portion 12, and a hinge portion 14 supporting the beam portion. Beam portion 12 has edge rails 16 at a first face 18. A flexible circuit 22 extends along the beam portion 12. Flexible circuit 22 comprises a metal layer 24, a plurality of trace conductors 26 and an insulative layer 28 between the metal layer and the conductors. Flexible circuit metal layer 24 defines flexure 32 supported by beam portion 12 distally of the edge rails 16 as shown. Flexure 32 comprises a frame 34 supporting a tongue 35 that carries limiter 38 and supports slider 42.

A stiffener 44 is provided having a concave portion 46 of a given height H open to the first face 18. Stiffener 44 has left and right flange portions 48, 52 of respective given widths W flanking the concave portion 46 and attached to the first face 18 in concave portion spacing relation by substantially the given widths W from the edge rails 16.

In preferred embodiments, typically, the beam portion first face 18 is tapered toward the flexure 32 and the stiffener 44 is generally congruent with the first face, both as shown. The flange portions 48, 52 have outward facing lateral edges 481, 521 that substantially abut the edge rails 16. "Substantial abutment" and is cognitives herein refer to contact spacing or close to contact spacing, e.g. spacing closer than the (thickness) width of the edge rail 16 is preferred, but other spacings can be used where the invention objectives of locating the stiffener in its desired location on the beam face 18 is realized.

The concave portion height dimension H is measured between the flanges 48, 52 and the top 461 of the concave portion 46. Flange portion width dimension W is measured between the concave portion wall 442, 443 where flanges 48, 52 commence and the respective an outward facing lateral edges 481, 521 of the flange portions 48, 52. Preferably, the concave height dimension H is less than each flange width W dimension, as shown.

In the illustrated embodiment, the beam portion face 18 has a beam portion aperture 54 defining an alignment feature 56, and the stiffener concave portion 46 has a concave portion aperture 58 defining a cooperating alignment feature 62 for registering the stiffener 44 with the beam portion face.

In a further embodiment, and with particular reference to FIGS. 3-5, the invention disk drive suspension 10 comprises a mount plate 64, and an outwardly tapered load beam 66 supported by spring or hinge portion 14. Load beam 66 comprises a beam portion 12 having a first face 18 with turned edges 16. A flexible circuit 22 extends along the beam portion 12. Flexible circuit 22 comprises a metal layer 24, a plurality of trace conductors 26 and an insulative layer 28 between the metal layer and the conductors. Flexible circuit metal layer 24 defines flexure 32 supported by beam portion 12 distally of the turned edges 16 as shown. Flexure 32 is supported by the beam portion 12 distally of the first face 18, as shown. A generally congruent, tapered stiffener 44 is provided extending for substantially the length of the beam face 18 between the hinge portion 14 and the flexure 32. Stiffener 44 has a central portion 46 of a given height H concave and open to the first face 18. Stiffener 44 has left and right flange portions 48, 52 extending laterally from the central portion 46 to the upturned edges 16 to locate the central portion centrally on the first face 18.

Generally, flange portions 48, 52 have outward facing lateral edges 481, 521, the lateral edges substantially abutting the face turned edges 16. Concave central portion 46 has a height dimension H between the flange portions 48, 52 and the top 461 of the central portion, and each flange portion has a width dimension W between the central portion and outward facing lateral edges 481, 521 of the flange portions. Central portion height dimension H is preferably not more than either flange width dimension W. As in previous embodiments, the beam portion face 18 and the central portion 44 have cooperating aligning structures 56, 62 for registering the stiffener 44 with the beam portion face.

In the invention method of stiffening a load beam 66, there is included juxtaposing with a beam portion 12 of load beam 55 having edge rails 16 a generally congruent stiffener 44 having a central portion 46 open to the beam portion and flanges 48, 52 extending laterally outward from the central portion and having lateral edges 481, 521, and centrally locating the stiffener central portion on the beam portion by juxtaposing in contact or near contact the flange lateral edges with the edge rails.

The invention thus provides a novel and improved disk drive suspension having a monocoque structure of a beam portion first face with turned edges and a generally congruent stiffener having a central portion of a given height that is concave and open to the beam portion, and wherein the stiffener has left and right flange portions which extend laterally from the central portion to the beam portion upturned edges to define the stiffener positioning and to locate said central portion centrally on the beam portion face.

We claim:

1. A disk drive suspension comprising a beam portion having upturned edge rails at a first face and a flexure supported by said beam portion distally of said edge rails, and a stiffener having a single concave portion of a given height open to said first face and left and right flange portions of respective given widths flanking said single concave portion, the stiffener attached in fixed relation to said first face such that said single concave portion is spaced from said edge rails by said flange given widths.

2. The disk drive suspension according to claim 1 in which said beam portion first face is tapered toward said flexure, said concave portion being generally congruent with said first face.

3. The disk drive suspension according to claim 1, in which said edge rails extend continuously along more than half of said beam portion, and said flange portions have outward facing lateral edges, said lateral edges substantially abutting said upturned edge rails.

4. The disk drive suspension according to claim 1, in which said concave portion has a height dimension between said flanges and the top of said concave portion, and each said flange portion has a width dimension between said concave portion and an outward facing lateral edge of said portion, said concave height dimension being less than each said flange width dimension.

5. The disk drive suspension according to claim 1, in which said beam portion face has a beam portion aperture defining an alignment feature, said stiffener concave portion having a concave portion aperture defining a cooperating alignment feature for registering said stiffener with said beam portion face.

6. The disk drive suspension according to claim 3, in which said concave portion has a height dimension between said flanges and the top of said concave portion, and each said flange portion has a width dimension between said concave portion and said outward facing lateral edge of said flange portion, said concave height dimension being less than each said flange width dimension.

7. The disk drive suspension according to claim 6, in which said beam portion face has a beam portion aperture defining an alignment feature, said stiffener concave portion having a concave portion aperture defining a cooperating alignment feature for registering said stiffener with said beam portion face.

8. The disk drive suspension according to claim 7, in which said beam portion first face is tapered toward said flexure, said concave portion being generally congruent with said first face.

9. The disk drive suspension according to claim 3, in which said lateral edges of said flange portions are disposed less than the thickness of said edge rails away from said edge rails.

10. The disk drive suspension according to claim 3, in which said lateral edges of said flange portions contact said edge rails.

11. A disk drive suspension comprising a mount plate, a hinge portion, an outwardly tapered load beam portion supported by said hinge portion, said beam portion having a first face with upturned edges, the upturned edges extending continuously along more than half of said load beam portion, and a flexure supported by said beam portion distally of said first face, and a generally congruent tapered stiffener, said stiffener attached to said load beam in fixed relation thereto, said stiffener having a central portion of a given height concave and open to said first face, said stiffener having left and right flange portions extending laterally from said central portion to said upturned edges to locate said central portion centrally on said first face.

12. The disk drive suspension according to claim 11, in which said flange portions have outward facing lateral edges, said lateral edges substantially abutting said face turned edges.

13. The disk drive suspension according to claim 12, in which said central portion has a height dimension between said flanges and the top of said central portion, and each said flange portion has a width dimension between said central portion and an outward facing lateral edge of said flange portion, said central portion height dimension being not more than either flange width dimension.

14. The disk drive suspension according to claim 13, in which said beam portion face and said central portion have cooperating aligning structures for registering said stiffener with said beam portion face.

15. The disk drive suspension of claim 11, wherein said left and right flange portions extend to within less than half a width of said upturned edges.

16. The disk drive suspension of claim 11, wherein said left and right flange portions of said stiffener contact said upturned edges in order to centrally locate said stiffener on said load beam.

17. A method of stiffening a load beam, including juxtaposing with a beam portion of a load beam having edge rails a generally congruent stiffener having a concave central portion open to said beam portion and flanges extending laterally outward from said central portion and having lateral edges, centrally locating said stiffener central portion on said beam portion by juxtaposing said flange lateral edges in abutment with said edge rails, and attaching said stiffener to said beam portion in fixed relation therewith.

* * * * *